US010919746B2

(12) United States Patent
Stone et al.

(10) Patent No.: US 10,919,746 B2
(45) Date of Patent: Feb. 16, 2021

(54) FLEXIBLE HYDROSTATICALLY NORMALIZED CRADLE TO SUPPORT FUSELAGE SECTIONS FOR ASSEMBLY

(71) Applicant: The Boeing Company, Chicago, IL (US)

(72) Inventors: Patrick B. Stone, Monroe, WA (US); Don Russell, Arlington, WA (US)

(73) Assignee: The Boeing Company, Chicago, IL (US)

( * ) Notice: Subject to any disclaimer, the term of this patent is extended or adjusted under 35 U.S.C. 154(b) by 764 days.

(21) Appl. No.: 15/339,089

(22) Filed: Oct. 31, 2016

(65) Prior Publication Data

US 2018/0118540 A1   May 3, 2018

(51) Int. Cl.
| | | |
|---|---|---|
| *B66F 7/16* | (2006.01) | |
| *B64F 5/00* | (2017.01) | |
| *B64F 5/10* | (2017.01) | |

(52) U.S. Cl.
CPC .................. *B66F 7/16* (2013.01); *B64F 5/00* (2013.01); *B64F 5/10* (2017.01)

(58) Field of Classification Search
CPC ...... B66F 7/16; B64F 5/10; B64F 5/00; B64F 5/50
USPC ......................................... 254/89 H; 414/589
See application file for complete search history.

(56) References Cited

U.S. PATENT DOCUMENTS

| | | | |
|---|---|---|---|
| 4,236,859 A | 12/1980 | Stearn et al. | |
| 4,461,455 A * | 7/1984 | Mills ........................ | B64F 5/50 |
| | | | 180/125 |
| 5,579,698 A * | 12/1996 | Lis ........................... | B61D 3/16 |
| | | | 105/176 |
| 5,887,854 A * | 3/1999 | Musson .................... | B66F 7/00 |
| | | | 254/89 H |
| 6,151,883 A | 11/2000 | Hatrick et al. | |
| 6,434,927 B1 | 8/2002 | Stretton | |
| 6,488,060 B1 * | 12/2002 | Giovanni .............. | B25B 11/005 |
| | | | 144/135.2 |
| 8,733,707 B2 | 5/2014 | Stone | |
| 10,093,217 B2 * | 10/2018 | Chicahuala ............... | B66C 5/02 |

(Continued)

FOREIGN PATENT DOCUMENTS

| | | |
|---|---|---|
| EP | 1995169 A2 | 11/2008 |
| EP | 2965836 A1 | 1/2016 |

(Continued)

OTHER PUBLICATIONS

"European Application Serial No. 13191174.5, Search Report dated Mar. 15, 2018", 7 pgs.

(Continued)

*Primary Examiner* — Orlando E Aviles
*Assistant Examiner* — Seahee Hong
(74) *Attorney, Agent, or Firm* — Kwan & Olynick LLP

(57) ABSTRACT

A fuselage cradle support assembly, which can be used as part of a jacking system during aircraft manufacture, is described. The fuselage cradle support assembly can include an array of fuselage cradles. The fuselage cradle support assembly can be configured to limit motion of each fuselage cradle in a cradle array to only vertical and horizontal movements. The vertical movements can be generated using actuators, such as hydraulic actuators, which are communicatively coupled to one another to distribute loads within the cradle array.

25 Claims, 7 Drawing Sheets

(56) References Cited

U.S. PATENT DOCUMENTS

| | | | |
|---|---|---|---|
| 10,213,823 B2* | 2/2019 | Oberoi | B60G 7/008 |
| 2009/0151320 A1 | 6/2009 | Sternberger | |
| 2010/0183372 A1 | 7/2010 | Coleman | |
| 2011/0030364 A1* | 2/2011 | Persson | E02F 9/2242 |
| | | | 60/428 |

FOREIGN PATENT DOCUMENTS

| | | |
|---|---|---|
| FR | 2788743 A1 | 7/2000 |
| WO | 2008023168 A1 | 2/2008 |

OTHER PUBLICATIONS

"European Application Serial No. 17198274.7, Office Action dated Jan. 24, 2019", 4 pgs.

"European Application Serial No. 17198274.7, Search Report dated Mar. 13, 2018", 11 pgs.

* cited by examiner

FLEXIBLE HYDROSTATICALLY NORMALIZED CRADLE TO SUPPORT FUSELAGE SECTIONS FOR ASSEMBLY

TECHNICAL FIELD

This disclosure generally relates to assemblies for supporting heavy structures. More specifically, this disclosure relates to assemblies for supporting an airframe during aircraft manufacture.

BACKGROUND

During airframe assembly of an aircraft, fuselage components need to be supported. Typically, fuselage components are crane loaded onto a support system which supports the component from underneath. The fuselage component is quite heavy and needs to be precisely positioned without damaging the fuselage component or compromising worker safety.

Past systems have used a variety of whiffletree type mechanisms to evenly distribute loads. The whiffletree mechanisms include unneeded pitching degrees of freedom that must be managed during crane loading. The management of the loads often requires placing personnel under suspended loads, which is a safety issue. In addition, the unneeded pitching degrees of freedom can generate uncertain edge loading conditions which may possibly cause damage to the supported airframe component. In view of the above, new apparatus and methods for supporting fuselage components during manufacture are desired.

SUMMARY

A fuselage cradle support assembly, which can be used as part of a jacking system during aircraft manufacture, is described. The fuselage cradle support assembly can include an array of fuselage cradles. The fuselage cradle support assembly can be configured to limit motion of each fuselage cradle in a cradle array to only vertical and horizontal movements. The vertical movements can be generated using actuators, which are communicatively coupled to one another in some manner, to distribute loads within the cradle array. In one embodiment, hydraulic actuators can be coupled to each fuselage cradle. The hydraulic actuators can be fluidly coupled to one another across multiple fuselage cradles to provide passive load distribution among the fuselage cradles in the cradle array.

In one aspect, an assembly can be generally characterized as comprising: 1) a first cradle configured to receive and support a fuselage section at a first location on the fuselage section, and move in only in first and second directions relative to the assembly where the first direction and the second direction can be approximately perpendicular; 2) a second cradle configured to receive and support the fuselage section at a second location on the fuselage section, and move only in the first and the second directions; 3) a first hydraulic actuator coupled to the first cradle and configured to move the first cradle only in the second direction; 4) a second hydraulic actuator coupled to the second cradle and configured to move the second cradle only in the second direction; 5) a hydrostatic system fluidly coupling the first hydraulic actuator and the second hydraulic actuator so that loads are distributed between the first cradle and the second cradle; and 6) a support structure configured to support the first cradle, the second cradle, the first hydraulic actuator, the second hydraulic actuator and the hydrostatic system.

In another aspect, a fuselage cradle support assembly can generally be characterized as comprising a first track, a second track, a third track, a first cradle, a second cradle, a first hydraulic actuator, a second hydraulic actuator and a support structure. The second track can be proximately perpendicular to the first track. The third track can be proximately perpendicular to the first track and proximately parallel to the second track. A support structure can be configured to support the first track, second track, the third track, first cradle, the second cradle, the first hydraulic actuator, the second hydraulic actuator and the hydrostatic system.

In this example, the cradle array can include the first cradle and the second cradle. The first cradle can be configured to receive and support a fuselage section, move in a first direction aligned with the first track and move in a second direction aligned with the second track. The second cradle can be configured to receive and support a fuselage section, move in the first direction aligned with the first track and move in the second direction aligned with the third track.

Load distribution among the cradles can be provided using hydraulic actuators. A first hydraulic actuator can be coupled to the first cradle and configured to move the first cradle in the second direction. A second hydraulic actuator can be coupled to the second cradle and configured to move the second cradle in the second direction; A hydrostatic system fluidly coupling the first hydraulic actuator and the second hydraulic actuator so that loads are distributed between the first cradle and the second cradle.

In a particular embodiment, the assembly can further comprise a first sleeve configured to receive the first cradle. The first hydraulic actuator can be disposed between the first sleeve and the first cradle. In this example, the first track can be mechanically coupled to the support structure and disposed between the first sleeve and the support structure.

In addition, a first mechanism can be coupled to the first sleeve and disposed between the first sleeve and the first track. The first mechanism can be configured to facilitate movement between the first sleeve and the first track in the first direction along the first track. The first mechanism can include a wheel and/or bearings. Further, a locking mechanism configured to secure the first sleeve at a first location on the first track can be provided. The second track can be disposed between the first sleeve and the first cradle such that the first cradle can move relative to the first sleeve in the second direction. To facilitate movement of the first cradle relative to the first sleeve in response to a force applied from the first hydraulic actuator, a first mechanism can be provided.

In other embodiments, a fourth track, proximately parallel to the first track, coupled to the support structure and disposed between the first sleeve and the support structure, can be provided. The first sleeve can be configured to move simultaneously along the first track and the fourth track. Further, the first track can be positioned on a first side of the first sleeve and the fourth track can be positioned on a second side of the first sleeve.

In another embodiment, a fourth track, proximately parallel to the second track and disposed between the first sleeve and the first cradle can be provided. The first cradle can be configured to move simultaneously along the second track and the fourth track. In addition, the second track can be positioned on a first side of the first sleeve and the fourth track can be positioned on a second side of the first sleeve.

In a further embodiment, a third hydraulic actuator can be provided. The third hydraulic actuator can be disposed between the first cradle and the first sleeve and coupled to the first cradle. It can be configured to move the first cradle in the second direction. The first hydraulic actuator can be positioned on a first side of the first sleeve and the third hydraulic actuator can be positioned on a second side of the first sleeve.

In yet another embodiment, a third hydraulic actuator can be coupled to the first cradle. The first hydraulic actuator and third hydraulic actuator can be configured to move the first cradle in the second direction. In addition, a fourth hydraulic actuator can be coupled to the second cradle.

The second hydraulic actuator and the fourth hydraulic actuator can be configured to move the second cradle in the second direction. Further, a second hydrostatic system can be configured to fluidly couple the third hydraulic actuator and the fourth hydraulic actuator. Alternatively, the first hydraulic actuator, the second hydraulic actuator, the third hydraulic actuator and the fourth hydraulic actuator can be fluidly coupled to one another via the hydrostatic system.

In additional embodiments, the first hydraulic actuator includes a first piston with a first piston area and the second hydraulic actuator includes a second piston with a second piston area. The first piston area and the second piston area can be a different area from one another. Also, the first piston area and the second piston area are a same area as each other. A first stop mechanism can be provided to limit an upward movement of the first hydraulic actuator. The first stop mechanism can be positioned to prevent the second hydraulic actuator from bottoming out when loads are applied to the first cradle and the second cradle.

The support structure can further include a first member proximately perpendicular to the first track. The first member can include a first interface on a first end configured to attach the first member to a first jack and a second interface on a second end configured to attach the first member to a second jack. The first member can be a straight beam with a top and a bottom. A bottom of the first cradle and a bottom of the second cradle each extend below the top of the first member.

Yet another aspect can be characterized as a method of using an assembly. The method can include 1) positioning, along a first direction, a first cradle and a second cradle on an assembly where the first cradle and the second cradle are constrained to move only in a first direction and a second direction, relative to the assembly and where a first hydraulic actuator is coupled to the first cradle and configured to move the first cradle in the second direction; a second hydraulic actuator is coupled to the second cradle and configured to move the second cradle in the second direction; and a hydrostatic system is fluidly coupled to the first hydraulic actuator and the second hydraulic actuator so that loads are distributed between the first cradle and the second cradle; 3) coupling the assembly to a first jack and a second jack; 4) adjusting a height of the assembly via first jack and the second jack and receiving a fuselage component onto the first cradle and the second cradle until the fuselage component comes to rest on the first cradle and the second cradle such that, via the first hydraulic actuator, the second hydraulic actuator and the hydrostatic system, the first cradle moves a first amount in the second direction and the second cradle moves a second amount in the second direction such that loads are distributed between the first cradle and the second cradle.

BRIEF DESCRIPTION OF THE DRAWINGS

Figure 1:
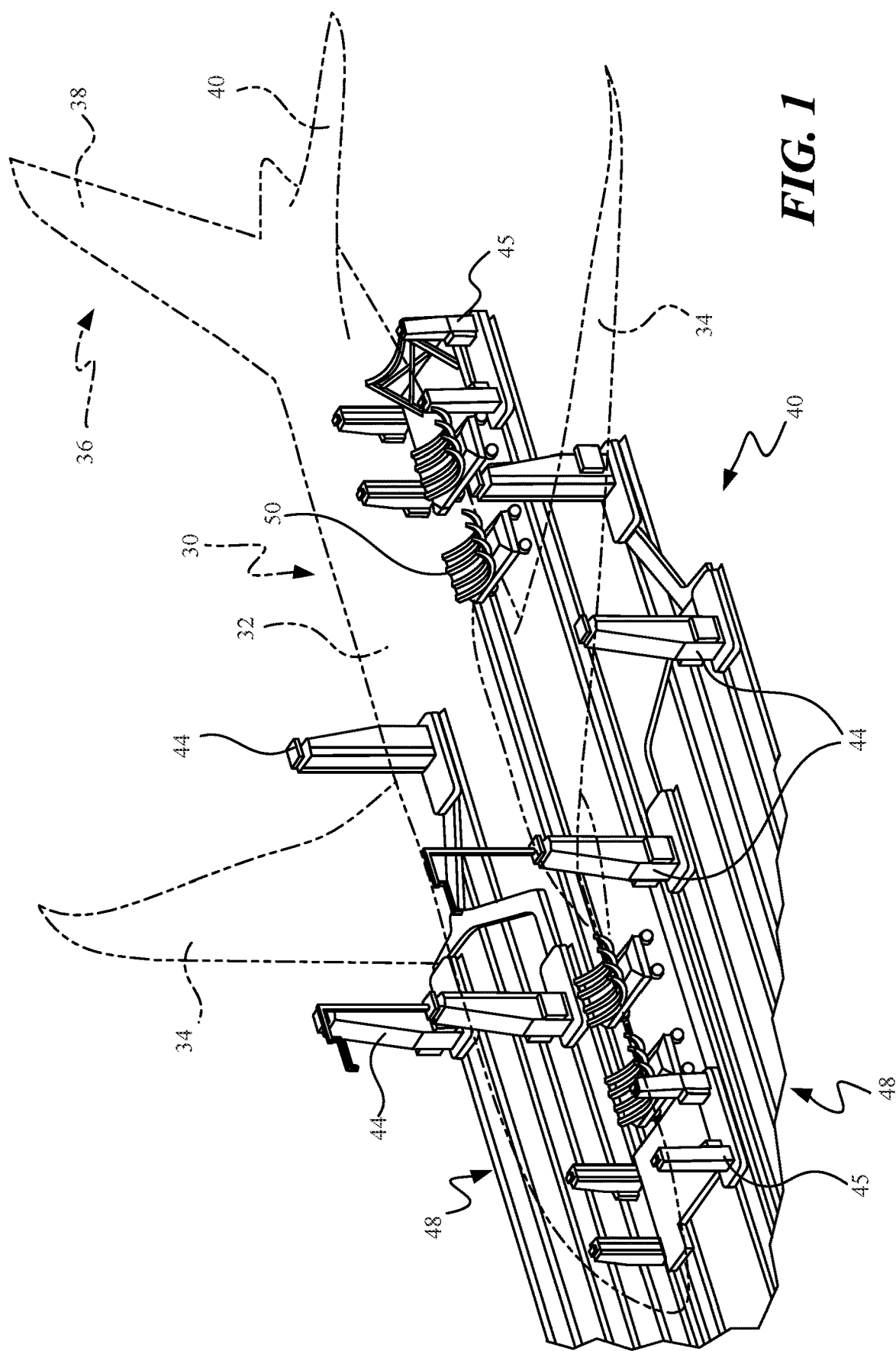

Having thus described examples of the disclosure in general terms, reference will now be made to the accompanying drawings, which are not necessarily drawn to scale, and wherein like reference characters designate the same or similar parts throughout the several views, and wherein:

FIG. 1 is a perspective view illustrating a jacking system used to assemble components of an airplane, the outline of an airplane being indicated in the phantom, according to one aspect of the present disclosure.

Figure 2:
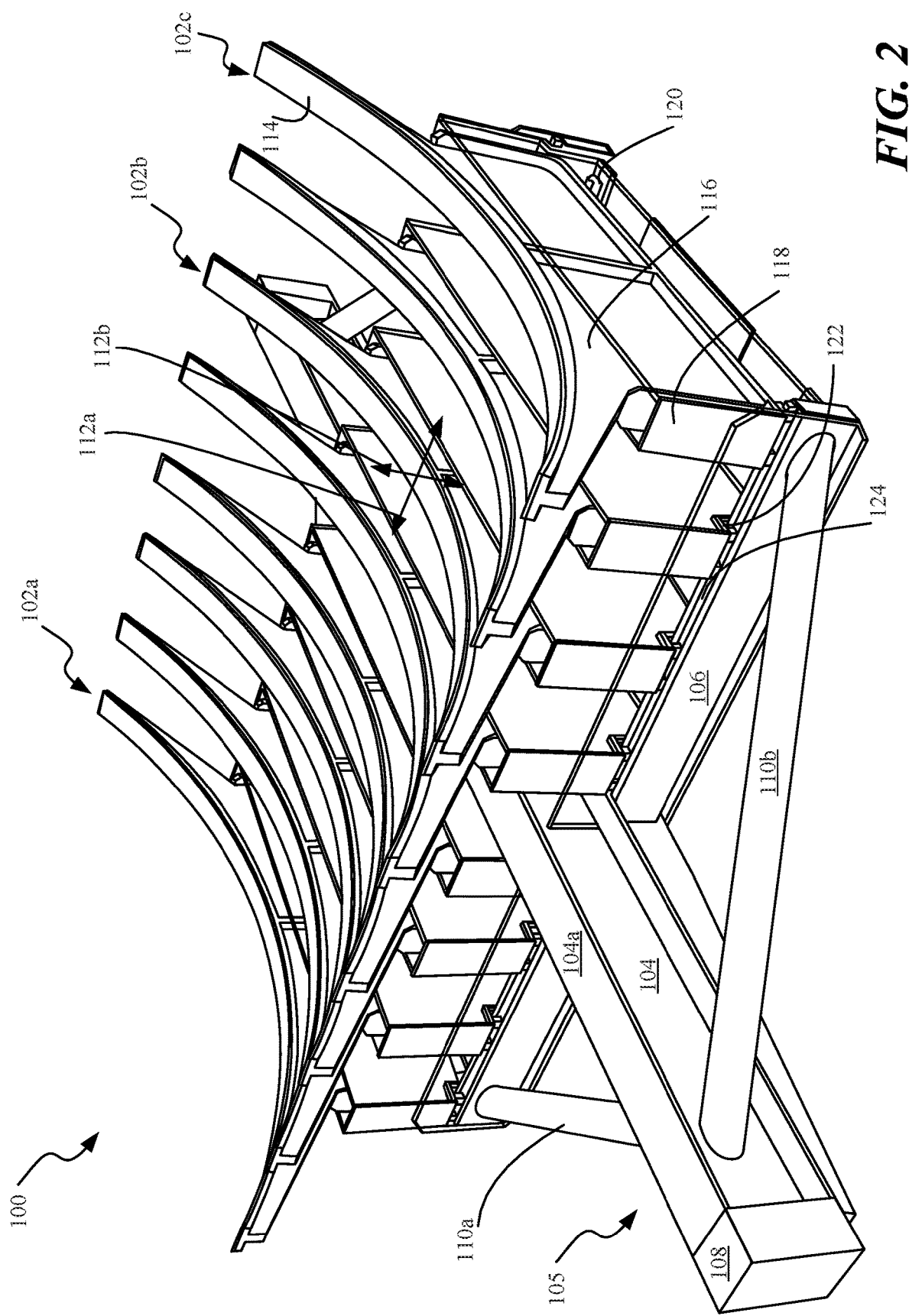

FIG. 2 is a perspective view of a fuselage support cradle assembly including a fuselage cradle array, which is a part of the jacking system shown in FIG. 1, according to one aspect of the present disclosure.

Figure 3:
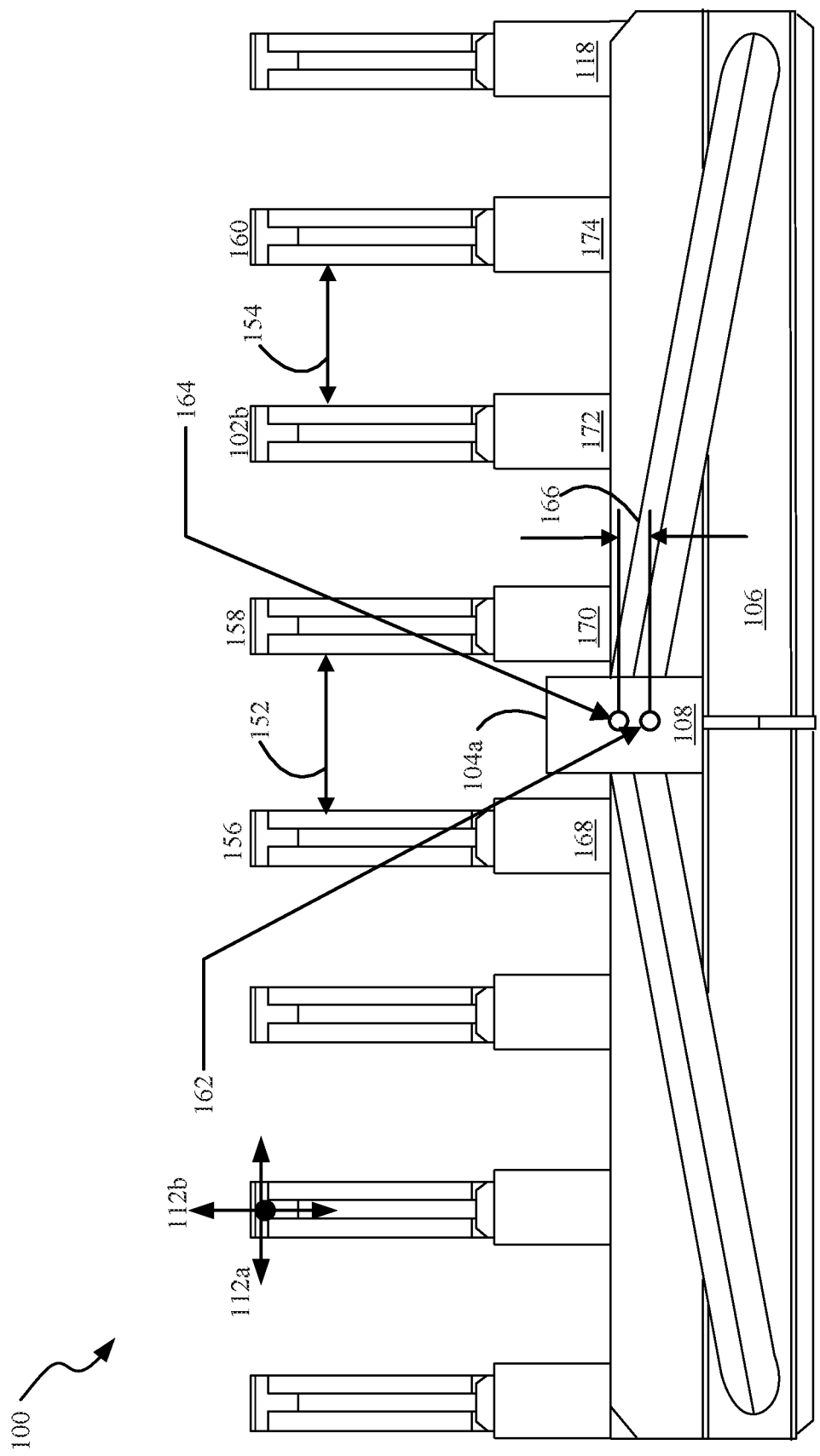

FIG. 3 is a side view of a fuselage support cradle assembly including a fuselage cradle array, which is a part of the jacking system shown in FIG. 1, according to one aspect of the present disclosure.

Figure 4B:
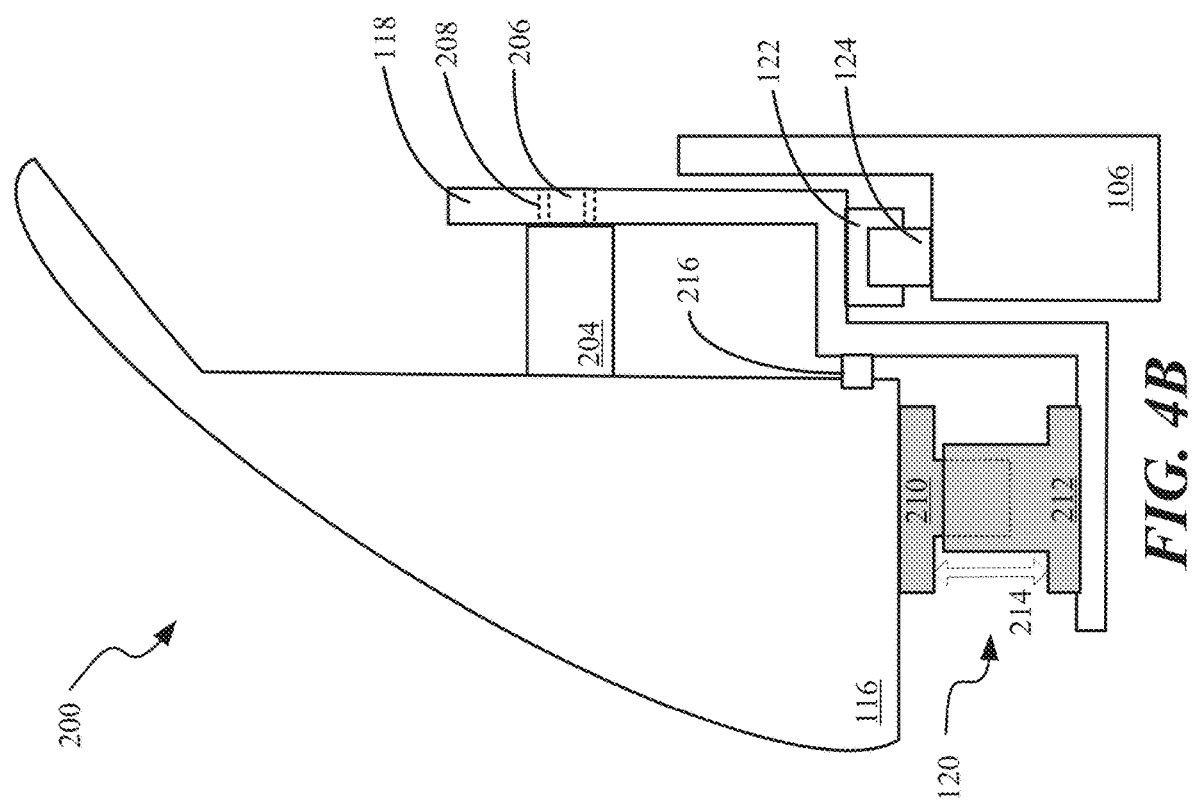
Figure 4A:
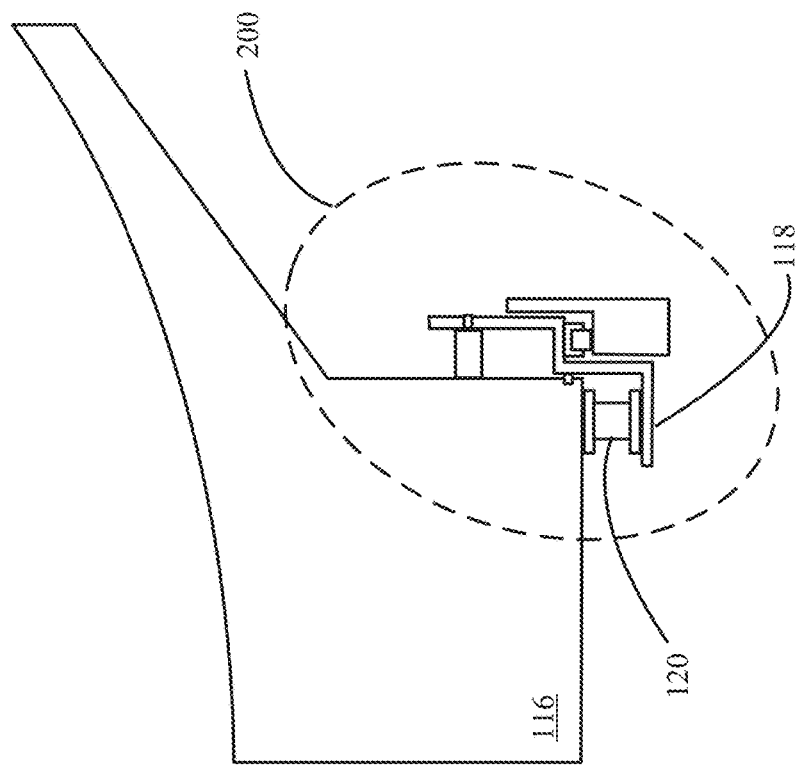

FIGS. 4A and 4B are side views of a movement system including hydrostatic actuation for a fuselage cradle, according to one aspect of the present disclosure.

Figure 5A:
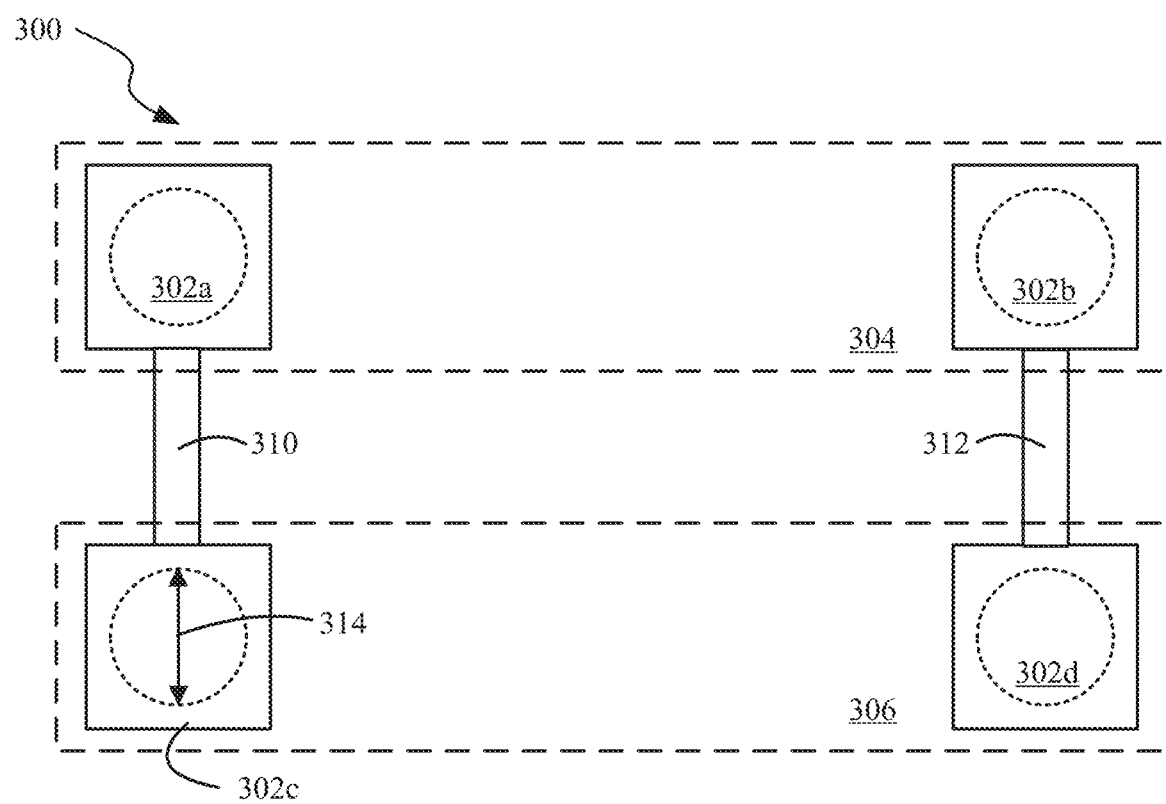
Figure 5B:
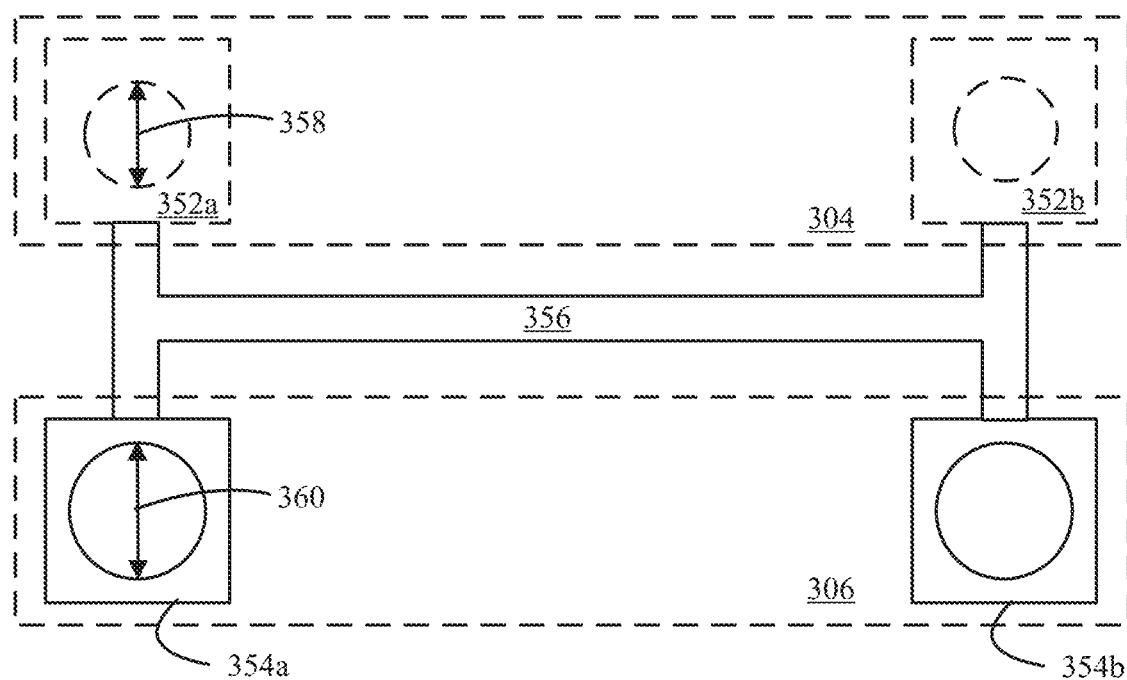

FIGS. 5A and 5B are top views of hydrostatic actuation systems used in a fuselage support cradle assembly, according to one aspect of the present disclosure.

Figure 6:
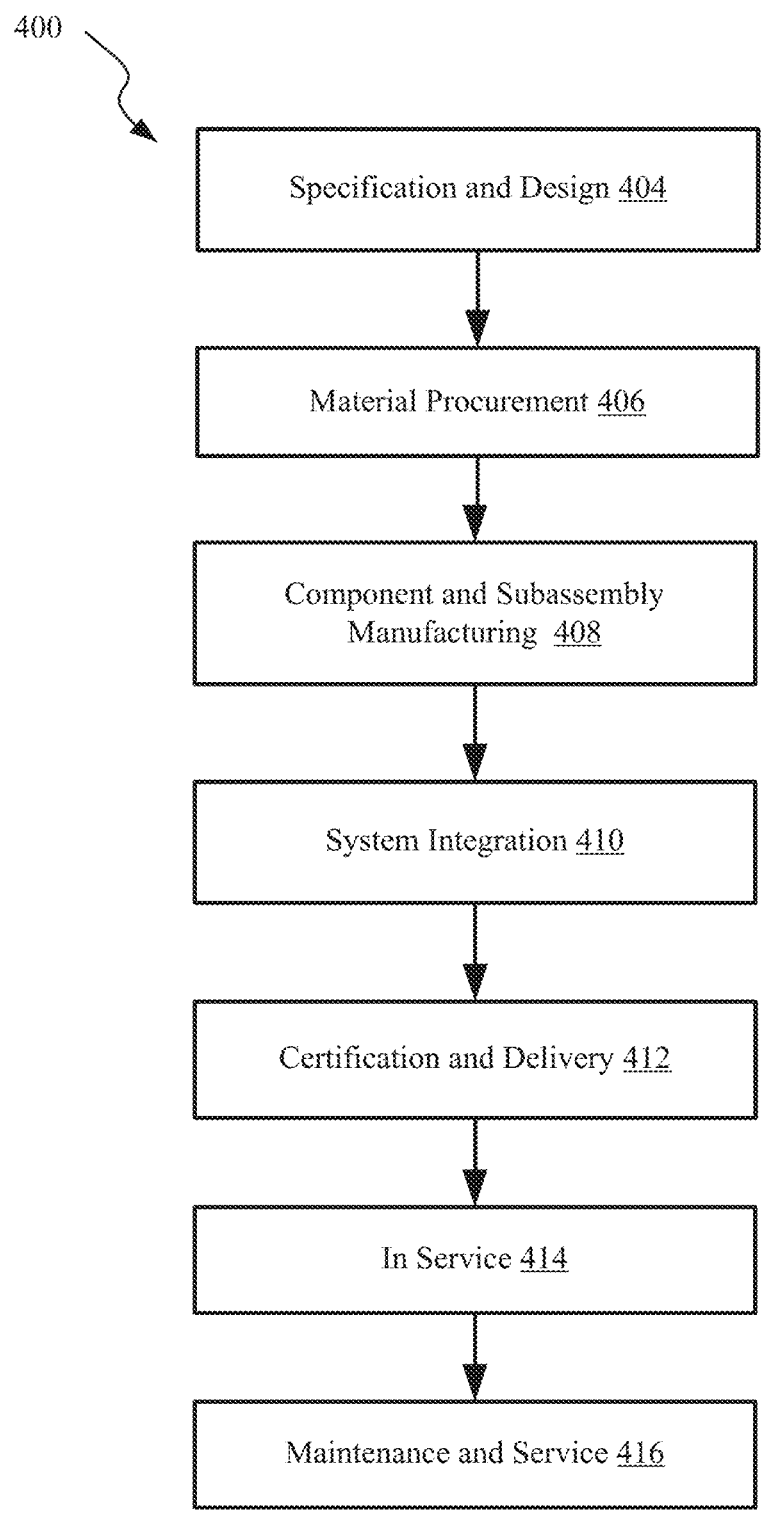
Figure 7:
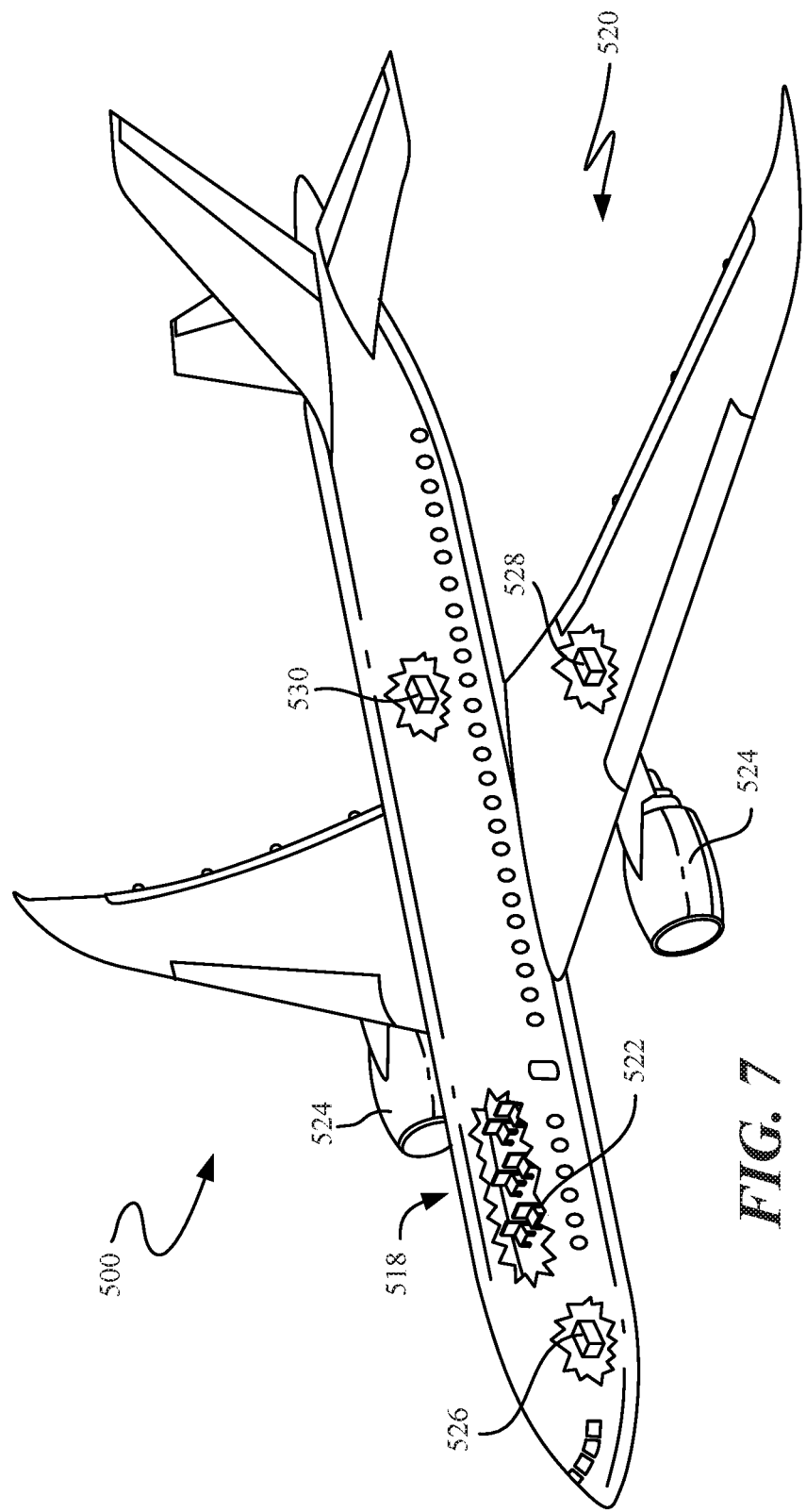

FIG. 6 is a block diagram of an aircraft production and service methodology that may utilize the fuselage support cradle assembly during manufacture, according to one aspect of the present disclosure FIG. 7 is a schematic illustration of an aircraft that may utilize the fuselage support cradle assembly during manufacture, according to one aspect of the present disclosure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.
Introduction Various embodiments of a fuselage cradle support assembly are described. The fuselage cradle support assembly includes an array of fuselage cradles, which each support the fuselage from underneath. The fuselage support assembly can be coupled to jacks. The jacks can be used to raise or lower the fuselage support assembly and hence the fuselage, which it supports.

The spacing between the fuselage cradles in the array can be varied to line up with structural components in the airframe, such as the ribs in the airframe, as well as to avoid objects which may protrude from the airframe. The cradle array can include an even or odd number of fuselage cradles, which allows for greater spacing control. In cradle designs using whipple tree mechanisms, to keep the loads balanced, only an even number of fuselage cradles can be used.

The fuselage cradle support assembly can be configured to limit motion of each fuselage cradle in a cradle array to only vertical and horizontal movements. The vertical movements can be generated using actuators, which are communicatively coupled to one another in some manner to distribute loads within the cradle array. In one embodiment, one or more hydraulic actuators can be coupled to each fuselage cradle. The hydraulic actuators can be fluidly coupled to one another across multiple fuselage cradles to provide passive load distribution among the fuselage cradles in the cradle array.

As will be described in more detail as follows, a jacking system used to assemble components of an airplane, which can utilize the fuselage support cradle assembly is described with respect to FIG. 1. With respect to FIGS. 2 and 3, one embodiment of a fuselage support cradle assembly including a fuselage cradle array is described. The fuselage support cradle assembly is designed to allow the fuselage cradles to each move only in the vertical and horizontal directions. With respect to FIGS. 4A and 4B, a movement system including hydraulic actuation for a fuselage cradle is discussed.

A hydrostatic actuation system, which can be used to vertically move fuselage cradles, is described with respect to FIGS. 5A and 5B. In regards to FIG. 6, a block diagram of an aircraft production and service methodology that may utilize the fuselage support cradle assembly during manufacture is discussed. Finally, with respect to FIG. 7, an example of an aircraft that may utilize the fuselage support cradle assembly during manufacture is described.

Jacking System

Referring to FIG. 1, a jacking system 40 is used to support and move components of the airplane 500 (see FIG. 7) into assembly positions. The assembly positions may be calculated by an external measurement system (not shown). The jacking system 40 may include moveable support members such as jacks 44 and 45. The fuselage cradle support assemblies, such as 50, are shown on wheeled carriages. However, the fuselage cradle support assemblies, such as 50, can also be coupled to the jacks, such as 44. The jacks, such as 44 as 45, can be mounted for movement on rails 48.

In the illustrated example, jacks 44 are used to support and move wing sections 34, however similar jacks (not shown) may be employed to support and move the tail assembly 36 including the vertical 38 and horizontal 40 components into final assembly position. The jacks 44 may be capable of moving a wing section 34 along any of multiple axes in order to precisely align the wing sections 34 with the fuselage 32. Based on the known position of each of the components, the jacking system 42 can move the components into their final assembly positions using movements that are automatically determined. In some embodiments, the optimal displacement of the jacks 44 and 45, as well as the final assembled position of the components can be determined automatically.

Fuselage Cradle Support Assembly

FIG. 2 is a perspective view of a fuselage support cradle assembly 100 including a fuselage cradle array. In this example, the array includes eight fuselage cradles, such as 102a and 102b. In particular embodiments, an array can include two or more fuselage cradles, such as two, three, four, five, six, seven, eight, nine or ten cradles. The array can utilize an even or odd number of cradles. In whipple tree designs, to balance the forces/loads only an even number of cradles can be utilized. A capability to use an odd number of cradles provides more flexibility in the spacing that can be achieved between each cradle.

Each cradle, such as 102a, 102b and 102c, includes a top surface, such as 114. The top surface comes in contact with the object that the fuselage cradle supports, such as a fuselage section. The top surface 114 can be padded to avoid damaging the surface of the object which the cradle supports. For example, the top surface 114 can be covered in neoprene rubber to avoid damaging the aluminum skin of an aircraft fuselage.

The top surface 114 of each cradle, such as 102a, 102b and 102c, can be shaped to follow a curve profile, such as a portion of a circle or an ellipse. The curve profile can also include straight portions. The top surface 114 can also be a general 3-D surface. In the example, in FIG. 2, the curve profile is a portion of a circle. The width of the top surface 114 is shown the same for each fuselage cradle. In alternate embodiments, the width can vary from cradle to cradle.

In alternate embodiments, the shape of the curve profile can be selected to conform to a shape of an object which is supported by the cradle, such as a portion of a fuselage section. In one embodiment, the curve profile used for the top surface 114 of each cradle is the same. In other embodiments, the curve profiles of the top surface 114 can vary from fuselage cradle to fuselage cradle, such as to account for changes in the shape of a fuselage section in the direction 112a, which is supported by the cradle array, including cradles 102a, 102b and 102c.

In one embodiment, a top portion one or more fuselage cradles can be removable. Thus, top portion can be removed to change the shape of the fuselage cradle. The shape can be changed to accommodate different objects having different shapes.

Each fuselage cradle, such as 102a, 102b and 102c, can include a body 116. The body 116 of the cradle can fit into a sleeve, such as 118. Each sleeve can support one or more actuators, such as 120. The actuators can be configured to raise or lower each fuselage cradle. Examples of actuators which may be utilized include but are not limited to hydraulic, pneumatic, electric, thermal/magnetic and mechanical actuators.

The sleeve provides a support structure for constraining the motion of the fuselage cradle in a selected direction. A sleeve doesn't have to be utilized. For example, mechanisms that only constrain the fuselage cradle on its sides may be used, such as receiving slots. Thus, a structure extending from one side of the cradle to other side doesn't have to be used.

Further, the receiving slots don't have to be movable. For example, a plurality of receiving slots with fixed locations can be utilized. When two fuselage cradles are placed in the assembly 100, the fuselage cradles can be placed in receiving slots adjacent to each other or one or more receiving slots can be skipped. The one or more receiving slots can be skipped to obtain a desired spacing between the two fuselage cradles.

In one embodiment, hydraulic actuators, such as 120, can be used. A hydraulic actuator can include a cylinder or fluid motor that uses hydraulic power to facilitate mechanical operation. The mechanical motion gives an output in terms of linear, rotary or oscillatory motion.

Typically, the hydraulic actuators can employ a relatively incompressible fluid to transfer forces between components of the actuator. Hydraulic fluids can be water or oil based. In addition, hydraulic fluids can contain a wide range of chemical compounds, including: oils, butanol, esters (e.g. phthalates, like DEHP, and adipates, like bis(2-ethylhexyl) adipate), polyalkylene glycols (PAG), organophosphate (e.g. tributylphosphate), silicones, alkylated aromatic hydrocarbons, polyalphaolefins (PAO) (e.g. polyisobutenes), corrosion inhibitors (including acid scavengers), anti-erosion additives, etc.

As an example, a hydraulic actuator can include a cylindrical tube along which a piston can slide. The action of the piston is provided through applying pressure to the hydraulic fluid. A single acting hydraulic actuator can use fluid pressure applied to just one side of the piston. The piston can move in only one direction, a spring or some other mechanism being frequently used to give the piston a return stroke. The term double acting is used when pressure is applied on each side of the piston. Thus, any difference in pressure between the two sides of the piston moves the piston to one side or the other.

In FIG. 2, the hydraulic actuator 120 is used to output linear motion in direction 112b. A track system (see FIGS. 4A and 4B,) can be used with each fuselage cradle to limit motion to the vertical direction 112b. In one embodiment, the track system, which can include a track, wheels and/or bearings, can be provided between the fuselage cradle and sleeve, such as between body 116 and sleeve 118. The track can be aligned with direction 112b. One or more tracks can be provided with each sleeve, such as 118. In one embodiment, all of the fuselage cradles can be configured to move in vertical direction 112b.

The track system can be used to constrain the motion of the fuselage cradle in a particular direction. Alternate mechanisms to constrain the motion of the fuselage cradle can be used. For example, one or more alignment pins (not shown) can extend from or extend into the fuselage cradle. Each alignment pin can extend into a cavity configured to receive the pin. The interaction between the cavity and the pin can constrain the motion of the fuselage cradle to a particular direction.

In another embodiment, an actuator can be disposed between a top of an alignment pin and the bottom of a cavity, which receives the alignment pin. The actuator can be configured to provide a force which moves the alignment pin relative to the receiving cavity. In a particular embodiment, an outer surface of an actuator can be used as an alignment pin.

Directions 112a and 112b are measured relative to fuselage cradle assembly 100. Thus, directions 112a and 112b may or may not be parallel and perpendicular to the ground. For example, if the fuselage cradle assembly is pitched relative to the ground, then directions 112a and 112b may not be parallel to the ground. However, as is described, in more detail as follows the fuselage cradle support system can be configured to allow each fuselage cradle to move only in directions 112a and 112b.

An active or passive force distribution system (see FIGS. 5A and 5B) can be used to control an amount of force which is output by each actuator. An active system can involve measuring the forces at each actuator, the position of each fuselage cradle and using an active control system. The active control system can be used to control the force output from each actuator and distribute the loads between the fuselage cradles in the cradle array.

A passive force distribution system automatically distributes the loads between two or more of the actuators. For example, when hydraulic actuators are used, two or more of the hydraulic actuators can be in fluid communication with one another. The fluid transfers forces between the actuators to balance the loads on each actuator and hence the forces acting on the cradles in the cradle array. In a Whipple tree mechanism, linked beams with pivot points are used to mechanically distribute the forces.

Returning to FIG. 2, a track system, including track 124 and a second track (not shown), is used to allow each fuselage cradle and sleeve pair to move in horizontal direction 112a. The tracks are aligned with direction 112a. In one embodiment, a mechanism, like bearings, such as 122, can be used to facilitate movement of the sleeves along the track 124. In other embodiment, wheels can be used. As is described in more detail with respect to FIG. 3, the track system can be used to adjust the spacing between each fuselage cradle.

A support structure 105 can be used to support the fuselage cradles and sleeves and provide an interface to jacks, such as 44, in a jacking system (See FIG. 1) or a carriage. In this example, the support structure 105, which is symmetric on either side of the fuselage cradles, includes: i) a first member 106 on which the track 124 sits, ii) a second member 104 perpendicular to member 106, iii) a third member 110a and iv) a fourth member 110b. The third member 110a and 110b provide torsional rigidity. Interface 108 is used to couple the assembly 100 to a jack or carriage. In this example, second member 104 is a straight beam.

In FIG. 2, the support structure 105 is for purposes of illustration only and is not meant to be limiting. Other support structure configurations can be used. For example, two cross beams, like 104, can be used, at either end of the assembly, to allow the assembly 100 to be coupled to four jacks instead for two jacks.

In one embodiment, a pair of jacks can be used to raise or lower assembly 100. The jacks can be used to raise either side of the assembly 100 by an equal amount, such that beam 104 is approximately parallel to the ground and direction 112b is in the lift direction associated with the jacks. In other embodiments, the jacks can be raised by an unequal amount, such that the assembly 100 is pitched relative to the ground.

FIG. 3 is a side view of a fuselage support cradle assembly 100. As shown in FIG. 2, a top surface 104a of beam 104 is above a bottom of the fuselage cradles. A jackball center 164 is the location where the jacks, such as 44 in FIG. 1, can be coupled to the assembly 100 via interface 108. The center of gravity 162 of the assembly 100 is slightly below the jack ball center 164. In this configuration, the distance 166 is about three inches. In one embodiment, the distance 166 is between 0 and 3 inches. In another embodiment, the distance is between 0 and 6 inches. In yet another embodiment, the distance is between 0 and 12 inches.

When a whipple tree mechanism is used, fuselage cradles tend to be taller. This positioning results in a center of a gravity of the assembly that is generally a farther distance from then jackball center as compared to the design shown in FIG. 3. The distance from the center of gravity 160 of the assembly 100 to the jack ball center 162 acts as a moment arm. Thus, minimizing this distance 166 reduces the associated moments and provides an assembly, such as 100, which is more easily controllable. In addition, the forces distributed throughout the fuselage cradles in the cradle array are more predictable As described with respect to FIG. 2, the fuselage cradles, such as 156, 158, 102b and 160, can be placed respectively in cradle supports, or sleeves, 168, 170, 172, 174 and 118. As described with respect to FIG. 2, each of the sleeves can be moved along a track. The track doesn't have to be continuous. For example, a number of discrete track sections can be used. Thus, the spacing between the sleeves, such as 152 and 154, can be adjusted. For example, the number of fuselage cradles and their spacing can be selected to align with the ribs of a fuselage section and/or avoid components protruding from the fuselage section. The spacing between sleeves, such as 152 and 154, can be the same or can be different.

In alternate embodiments, a sleeve doesn't have to be utilized. For example, a plurality of receiving slots in fixed positions can be used. To provide a desired space between fuselage cradles, one or more receiving slots can be skipped between the fuselage cradles. Also, the receiving slots don't have to fully surround a fuselage cradle. For example, a receiving slot may only constrain the motion of the fuselage cradle on its sides.

In one embodiment, locking mechanisms can be provided to lock the sleeves in place. For example, pins or clamps can be used to secure the position of the fuselage cradles. Thus, after the fuselage section and sleeve are positioned on the track, its position can be fixed using the locking mechanism.

FIGS. 4A and 4B are side views of a movement system including hydrostatic actuation for a fuselage cradle. FIG. 4A shows hydraulic actuator 120, which is configured to push against sleeve 118 to raise or lower the fuselage cradle with body 116. As will be described in more detail with respect to FIGS. 5A and 5B, the hydraulic actuator can be fluidly coupled to one or more other hydraulic actuator to distribute a supported load.

In FIG. 4B, details of the actuator 120, sleeve 118 and support structure 106 are shown. The hydraulic actuator 120 includes a piston 210 which moves within a cylinder in the bottom portion 212. Hydraulic pressure can cause the piston 210 to move relative to the bottom portion 212 and increase or decrease distance 214. Member 216, which is coupled to the fuselage cradle body 116, can be configured to move along a vertically aligned track (not shown). In this embodiment, the track is mechanically coupled to sleeve 118. A second track (not shown) can be located on the other, opposing, side of the sleeve 118. Wheels or bearings can be used to facilitate the movement along the track.

The one or more vertically aligned tracks can be used to limit the movement of fuselage cradle to only the vertical direction. As described above, the sleeve 118 can move along track 124 in a horizontal direction. Thus, each fuselage cradle can be constrained to have only two degrees of freedom of movement relative to support structure 106, i.e., vertical motion and horizontal motion.

In one embodiment, the movement of the fuselage cradle can be up limited where up refers to moving in a direction with a component that is opposite the direction of gravity. When two hydraulic actuators are fluidly coupled together, loading the actuators in an unbalanced way can cause one of the actuators to rise and the other to sink. When the actuator that rises is up limited, it is prevented from rising beyond a certain height. For example, if actuator 120 is coupled to one or more other actuators and the one or more other actuators are being loaded in a manner that causes actuator 120 to rise, distance 214 can have a maximum value imposed by a physical mechanism, such as a structure that stops the upward motion of the actuator.

When the maximum height is reached for one of the hydraulic actuators that are fluidly coupled to one another, the pressure on the fluid in the hydrostatic system starts to increase. The increase in pressure can stop the downward movement of the piston in the hydraulic actuator that was sinking. The system can be designed with up limited positions and an unloaded fluid pressure that are selected to prevent any one of the hydraulic actuators from bottoming out when the fuselage cradles are loaded. The unloaded fluid pressure determines the initial height of the actuators when only the weight of the fuselage cradles are supported (i.e., no additional weight is resting on the cradles).

The hydrostatic system can be designed to handle pressures associated with supporting the weight of a fuselage section in static position. In addition, the manner in which the fuselage support cradle assembly is dynamically loaded can affect the pressures. Thus, the hydrostatic system can be designed to handle pressures that can occur during dynamic loading. The maximum pressures can determine the types of fittings, conduits and hydraulic fluid, which are needed for the hydrostatic system. Further, the maximum pressure of the hydrostatic system, the expected load and loading conditions can determine a minimum pressure to which the system is initialized in an unloaded state.

Returning to FIG. 4B, an example of a mechanism that limits the upward motion of the fuselage cradle, and hence the actuator 120, is shown. A solid member 204 extends from the body 116 of the fuselage cradle. A stopper 206 extends through an aperture 208 in the sleeve 118. The top portion 210 of actuator 120 can rise. Hence, member 204 with stopper 206 can rise. When the stopper 206 reaches a top of the aperture 208, the fuselage cradle and hence, the top portion 210 of actuator 120 can be prevented from rising further. Thus, if the load on the hydrostatic system continues to rise, the pressure in the hydrostatic system will rise.

In particular embodiments, one or more mechanisms which limit the upward motion of the fuselage cradle can be provided with each fuselage cradle. For example, two mechanisms that limit the upward motion of the fuselage cradles can be provided on either side of the fuselage. Thus, the mechanism including member 204, stopper 206 and aperture 208 can be provided on the other side of the fuselage cradle.

In yet other embodiments, the fuselage cradles in the fuselage cradle array can be upward limited such that the maximum height to which each fuselage cradle can rise is the same. In yet other embodiments, the fuselage cradles in the fuselage cradle array can be upward limited such that the maximum height to which each fuselage cradle can rise varies from fuselage cradle to fuselage cradle in the cradle array. For example, a "V" shaped pattern can be used where the fuselage cradles near the ends of the cradle array can be allowed to rise higher than the fuselage cradles near the middle of the array. This "V" arrangement pattern of the maximum cradle heights affects the possible load distributions that the fuselage cradle can experience.

In one embodiment, a line can be drawn between the maximum and minimum cradle heights. The limited heights of the fuselage cradles between the maximum and minimum can be arranged along the line. Two lines can be used to form the "V" shaped arrangement. As an example, the angle between each line in the "V" and a horizontal line can be about one degree. Larger or smaller angles can be used. Also, other arrangement patterns can be employed and the example of the "V" shape is provided for the purposes of illustration only.

As mentioned above, two or more hydrostatic actuators can be fluidly coupled to one another in a hydrostatic actuation system. FIGS. 5A and 5B are top views of hydrostatic actuation systems used in a fuselage support cradle assembly. In FIGS. 5A and 5B, hydrostatic actuation systems 300 and 350 are shown. In hydrostatic systems 300 and 350, two hydrostatic actuators are used to support each fuselage cradle. For example, in 300, actuators 302a and 302b are used to support fuselage cradle 304 and actuators 302c and 302d are used to support fuselage cradle 306. In 350, actuators 352a and 352b are used to support fuselage cradle 304 and actuators 354a and 354b are used to support cradle 306.

In particular embodiments, one or more actuators can be used to support each fuselage cradle, such as one, two, three, etc. actuators per fuselage cradle. For example, three actuators can used to support cradle 304 instead of two actuators. The number of actuators used to support each fuselage cradle can vary from cradle to cradle in the cradle array. For example, three actuators can be used to support cradle 304 and a single actuator can be used to support cradle 306.

In yet other embodiments, in the hydrostatic system, actuators with the same area piston head can be used for each of the actuators. For example, in 300, actuators 302a, 302b, 302c and 302d each use a circular piston head with diameter 314. The piston determines the response of the actuator, i.e., the movement of the piston, to the hydraulic pressure. With an incompressible hydraulic fluid, the pressure at each piston head is the same for each actuator that is fluidly coupled. Thus, the actuators, which are fluidly coupled to one another, such as (302a to 302c) or (302b to 302d) can each be expected to respond to a common pressure. Thus, actuators 302a and 302c may see a first pressure and actuators 302b and 302d may see a second pressure.

In further embodiments, in the hydrostatic system, actuators with different area piston heads can be used. For example, in 300, actuators 352a and 352b have a piston head of a first diameter 358 and actuators 354a and 354b have a piston head of a second diameter 360. The actuators 352a, 352b, 354a and 354b, are each fluidly coupled to one another via fluid system 356. Thus, the actuators can each see an equal pressure. However, because the piston head sizes vary between the actuators, the load distribution between the actuators is different than if all the actuators used an actuator piston head of the same size.

The fluid system fluidly couples the hydraulic actuators to one another. The fluid system can include rigid and/or flexible tubes and fittings which couple the tubes together and to the hydraulic actuators. One or more bleed valves can be provided which allow gas to be removed from the system. Further, one or more interfaces can be provided which allow a hydraulic fluid to be added or drained from the fluid system. Hydraulic actuators which are fluidly coupled share a common pressure.

In one embodiment, each cradle in the cradle array includes a hydraulic actuator on each side of the cradle, i.e., two actuators per cradle. The hydraulic actuators on each side of the cradle are each coupled to one another. However, the hydraulic actuators on either side are not cross linked. Thus, actuators 302a and 302c are fluidly coupled to one another via hydrostatic fluid system 310 and actuators 302b and 302b are fluidly coupled to one another via hydrostatic fluid system 312. However, there is no fluid communication between the fluid system 310 and 312.

In the example shown in FIGS. 2 and 3, the cradle array includes eight fuselage cradles with two actuators per cradle. Thus, a first set of eight hydraulic actuators on one side of the cradle array can be fluidly linked together and a second set of eight hydraulic actuators on the other side of the cradle array can be fluidly coupled together. However, first set of hydraulic actuators and the second set of hydraulic actuators may not be fluidly coupled to one another.

In yet another embodiment, in fluid system 350, all of the hydraulic actuators are fluidly coupled to one another via fluid system 356. In general, each hydraulic actuator in the cradle array can be fluid coupled to no other hydraulic actuators, all of the hydraulic actuators or some portion thereof (i.e., one or more other hydraulic actuators). Thus, the assembly can include two or more fluid subsystems, which are not fluidly coupled to one another. For example, a fluid system with six hydraulic actuators can be configured such that 1) all six of the hydraulic actuators are fluidly coupled together, 2) a set of two are fluidly coupled together and a set of four are fluidly coupled together, 3) a first set of two actuators are fluidly coupled together, a second set of two actuators are fluidly coupled together and third set of two actuators are fluidly coupled together, 4) one actuator is not fluidly coupled to any other actuator and five actuators are fluidly coupled to one another, etc.

As described above, the fluid coupling between actuators affects the distribution of loads on each cradle in the cradle array. For non-hydraulic system, similar coupling schemes can be utilized. For example, an active system can be configured to control all the actuators as a group or the actuators can be divided into sub-groups and each sub-group can be controlled.

Examples of Aircraft Application

An aircraft manufacturing and service method 400 shown in FIG. 6 and an aircraft 500 shown in FIG. 7 are now be described to better illustrate various features of processes and systems presented herein. The fuselage cradle support assembly can be used in any stage of the aircraft lifetime, such as prototyping, manufacture, operations and maintenance. As was described above, a cradle support assembly design can be used for supporting other types of objects and is not limited to supporting only an airframe. For example, the cradle support assembly can be used to support a tank or a rocket section during manufacture.

During pre-production, aircraft manufacturing and service method 400 may include specification and design 402 of aircraft 500 and material procurement 404. The production phase involves component and subassembly manufacturing 406 and system integration 408 of aircraft 500. Aspects of component and subassembly manufacturing were described above with respect to FIG. 1. Thereafter, aircraft 500 may go through certification and delivery 410 in order to be placed in service 412. While in service by a customer, aircraft 500 is scheduled for routine maintenance and service 414 (which may also include modification, reconfiguration, refurbishment, and so on). While the embodiments described herein relate generally to servicing of commercial aircraft, they may be practiced at other stages of the aircraft manufacturing and service method 400.

Each of the processes of aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 7, aircraft 500 produced by illustrative method 400 in FIG. 6 may include airframe 518 with a plurality of high-level systems 520 and interior 522. Examples of high-level systems 520 include one or more of propulsion system 524, electrical system 526, hydraulic system 528, and environmental system 530. Any number of other systems may be included. Although an aerospace example is shown, the principles disclosed herein may be applied to other industries, such as the automotive or shipping industry. Accordingly, in addition to aircraft 502, the principles disclosed herein may apply to other vehicles, e.g., land vehicles, marine vehicles, space vehicles, etc.

Apparatus and methods shown or described herein may be employed during any one or more of the stages of the aircraft manufacturing and service method 500. For example, components or subassemblies corresponding to component and subassembly manufacturing 408 may be fabricated or manufactured in a manner similar to components or subassemblies produced while aircraft 500 is in service. Also, one or more aspects of the apparatus, method, or combination thereof may be utilized during operations 408 and 410, for example, by substantially expediting assembly of or reducing the cost of aircraft 500. Similarly, one or more aspects of the apparatus or method realizations, or a combination thereof, may be utilized, for example and without limitation, while aircraft 500 is in service, e.g., maintenance and service 416.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. An assembly comprising:
a first cradle, comprising a first top surface, having a curved profile and configured to receive and support a fuselage section at a first location on the fuselage section;
a second cradle, comprising a second top surface, having a curved profile and configured to receive and support the fuselage section at a second location on the fuselage section;
a support structure, supporting the first cradle and the second cradle, allowing the first cradle to move relative to the second cradle in a first direction, and comprising a first member, proximately perpendicular to the first direction,
wherein the first member is a straight beam and comprises a first interface on a first end, configured to attach the first member to a first jack, and a second interface on a second end, configured to attach the first member to a second jack, and
wherein a bottom of the first cradle and a bottom of the second cradle each extends below a top of the first member;
a first hydraulic actuator, coupling the first cradle to the support structure and configured to move the first cradle only in a second direction, perpendicular to the first direction;
a second hydraulic actuator, coupling the second cradle to the supporting structure and configured to move the second cradle only in the second direction; and
a hydrostatic system, fluidly coupling the first hydraulic actuator and the second hydraulic actuator so that loads are distributed between the first cradle and the second cradle during dynamic loading of the first cradle and the second cradle.

2. The assembly of claim 1, further comprising a first cradle support, configured to receive the first cradle, wherein the first hydraulic actuator is disposed between the first cradle support and the first cradle.

3. The assembly of claim 2, further comprising a first guide mechanism, aligned with the first direction, mechanically coupled to the support structure and disposed between the first cradle support and the support structure.

4. The assembly of claim 3, wherein the first guide mechanism comprises a track or a slot.

5. The assembly of claim 3, further comprising a first mechanism, coupled to the first cradle support, disposed between the first cradle support and the first guide mechanism, and configured to facilitate movement of the first cradle support in the first direction.

6. The assembly of claim 5, wherein the first mechanism comprises at least one of a wheel or bearings.

7. The assembly of claim 2, further comprising a second guide mechanism configured to constrain a motion of the first cradle, relative to the first cradle support, to the second direction in response to a force applied from the first hydraulic actuator.

8. The assembly of claim 7, wherein the second guide mechanism comprises one or more alignment pins.

9. The assembly of claim 7, wherein the second guide mechanism is disposed between the first cradle support and the first cradle.

10. The assembly of claim 2, further comprising a third hydraulic actuator, disposed between the first cradle and the first cradle support, and coupled to the first cradle, configured to move the first cradle in the second direction, wherein the first hydraulic actuator is positioned on a first side of the first cradle support and the third hydraulic actuator is positioned on a second side of the first cradle support.

11. The assembly of claim 1, further comprising:
a third hydraulic actuator, coupled to the first cradle, the first hydraulic actuator and the third hydraulic actuator configured to move the first cradle in the second direction, and
a fourth hydraulic actuator coupled to the second cradle, the second hydraulic actuator and the fourth hydraulic actuator configured to move the second cradle in the second direction.

12. The assembly of claim 11, further comprising a second hydrostatic system configured to fluidly couple the third hydraulic actuator and the fourth hydraulic actuator.

13. The assembly of claim 11, wherein the first hydraulic actuator, the second hydraulic actuator, the third hydraulic actuator and the fourth hydraulic actuator are fluidly coupled to one another via the hydrostatic system.

14. The assembly of claim 1,
wherein the first hydraulic actuator comprises a first piston with a first piston area,
wherein the second hydraulic actuator comprises a second piston with a second piston area, and
wherein the first piston area and the second piston area are different.

15. The assembly of claim 1,
wherein the first hydraulic actuator comprises a first piston with a first piston area,
wherein the second hydraulic actuator comprises a second piston with a second piston area, and wherein the first piston area and the second piston area are same.

16. The assembly of claim 1, further comprising a first stop mechanism, configured to limit an upward movement of the first hydraulic actuator, wherein the first stop mechanism is positioned to prevent the second hydraulic actuator from bottoming out when the loads are applied to the first cradle and the second cradle.

17. The assembly of claim 1, wherein each of the first top surface and the second top surface is formed by neoprene rubber.

18. The assembly of claim 1, wherein the curved profile of the first top surface is different from the curved profile of the second top surface.

19. The assembly of claim 1, wherein the first top surface of the first cradle is removable.

20. The assembly of claim 2, wherein the first die support s a sleeve.

21. The assembly of claim 1, wherein the hydrostatic system comprises an active force distribution system, configured to control a force output of each of the first hydraulic actuator and the second hydraulic actuator.

22. The assembly of claim 1, wherein the hydrostatic system comprises a passive force distribution system, configured to automatically distribute loads between the first hydraulic actuator and the second hydraulic actuator.

23. The assembly of claim 1, wherein the support structure further comprises:
   a second member, perpendicular to the first member, and
   a third member and a fourth member, each extending and connected to the first member and the second member and providing torsional rigidity to the support structure.

24. The assembly of claim 1, wherein the first interface is configured to attach the first member to the first jack at a jack ball center.

25. The assembly of claim 24, wherein the jack ball center is positioned above a center of gravity of the assembly.

* * * * *